(12) United States Patent
Hu et al.

(10) Patent No.: US 9,305,083 B2
(45) Date of Patent: Apr. 5, 2016

(54) AUTHOR DISAMBIGUATION

(75) Inventors: Yunhua Hu, Beijing (CN); Zaiqing Nie, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 302 days.

(21) Appl. No.: 13/358,884

(22) Filed: Jan. 26, 2012

(65) Prior Publication Data

US 2013/0198192 A1 Aug. 1, 2013

(51) Int. Cl.
*G06F 17/30* (2006.01)
(52) U.S. Cl.
CPC .... *G06F 17/30705* (2013.01); *G06F 17/30864* (2013.01)
(58) Field of Classification Search
CPC .................. G06F 17/30598; G06F 17/30705; G06F 17/30864
USPC ........... 707/738, 999.002, 737, 758; 715/201; 725/42, 46, 52, 53
See application file for complete search history.

(56) References Cited

U.S. PATENT DOCUMENTS

| 7,752,208 | B2* | 7/2010 | Amitay et al. ................ 707/749 |
| 7,953,724 | B2 | 5/2011 | Griffith |
| 2008/0256093 | A1* | 10/2008 | Amitay et al. ................ 707/100 |
| 2008/0275859 | A1* | 11/2008 | Griffith ............................. 707/4 |
| 2010/0017431 | A1* | 1/2010 | Schmidt et al. ............... 707/102 |
| 2012/0303557 | A1* | 11/2012 | Lu et al. .......................... 706/12 |

OTHER PUBLICATIONS

C Dozier et al., Automatic Extraction and Linking of Person Names in Legal Text, 2000, Google, 17 pages.*
WilliamW. Cohen et al., A Comparison of String Metrics for Matching Names and Records, 2003, IEEE, 6 pages.*
A. Culotta et al., "Author Disambiguation using Error-driven Machine Learning with a Ranking Loss Function", In Workshop on Information Integration on the Web, Jul. 2007, 6 pages.
A. McCallum et al., "Efficient Clustering of High-dimensional Data Sets with Application to Reference Matching", In Proceedings of the 6th ACM SIGKDD international conference on Knowledge discovery and datamining, Aug. 2000, 10 pages.
Bekkerman, et al., "Disambiguating Web Appearances of People in a Social Network", In Proceedings of 14th International Conference on World Wide Web, May 10-14, 2005, pp. 463-470.
Bilenko et al., "Adaptive Name Matching in Information Integration," IEEE Intelligent Systems, Sep./Oct. 2003, 8 pages.
Byung-Won On et al., "Comparative Study of Name Disambiguation Problem using a Scalable Blocking-based Framework", In ACM/IEEE Joint Conference on Digital Libraries, Jun. 7-11, 2005, 10 pages.
D. A. Pereira et al., "Using Web Information for Author Name Disambiguation", In ACM/IEEE Joint Conference on Digital Libraries, Apr. 18, 2009, Ibiza, 40 pages.
D. G. Feitelson, "On Identifying Name Equivalences in Digital Libraries", Journal of Information Research, Jul. 2004, 17 pages.

(Continued)

*Primary Examiner* — Jean B Fleurantin
(74) *Attorney, Agent, or Firm* — Steve Wight; Sandy Swain; Micky Minhas

(57) ABSTRACT

The techniques described herein automatically generate high precision clusters and high recall clusters for a set of documents having an author with a same or similar name. The high precision clusters and the high recall clusters can then be used in a labeling process so that efficient and accurate author disambiguation is realized.

17 Claims, 6 Drawing Sheets

(56) References Cited

OTHER PUBLICATIONS

E. Minkov et al., "Contextual Search and Name Disambiguation in Email using Graphs", In Proceedings of the 29th ACM SIGIR international conference on Research and Development in Information Retrieval, SIGIR 06, Aug. 6-11, 2006, Seattle, WA, 8 pages.

F. Wang et al., "Name Disambiguation using Atomic Clusters", In Proceedings of the 9th International Conference on Web-Age Information Management, Jul. 2008, 8 pages.

Ferreira, et al., "Effective Self-Training Author Name Disambiguation in Scholarly Digital Libraries", In Proceedings of 10th Annual Joint Conference on Digital libraries, Jun. 21-25, 2010, pp. 39-48.

H. Han et al., "A Model-based k-means Algorithm for Name Disambiguation", In International Semantic Web Conference, Oct. 2003, 6 pages.

H. Han et al., "Automatic Document Metadata Extraction using Support Vector Machines", In ACM/IEEE Joint Conference on Digital Libraries, May 2003, 12 pages.

H. Han et al., "Name Disambiguation in Author Citations using a K-way Spectral Clustering Method", In ACM/IEEE Joint Conference on Digital Libraries, Jun. 7-11, 2005, Denver, Colorado, pp. 334-343.

H. Han et al., "Two Supervised Learning Approaches for Name Disambiguation in Author Citations", In ACM/IEEE Joint Conference on Digital Libraries, Jun. 7-11, 2004, Tuscon, Arizona, pp. 296-305.

H. Li et al "Word Clustering and Disambiguation based on Co-occurrence Data", In Proceedings of the 17th Internation Conference on Computational Linguistics, Aug. 1998, 7 pages.

Han, et al., "A Hierarchical Naive Bayes Mixture Model for Name Disambiguation in Author Citations", In Proceedings of ACM Symposium on Applied Computing, Mar. 13-17, 2005, pp. 1065-1069.

J. Artiles et al., "The SemEval-2007 WePS Evaluation: Establishing a Benchmark for the Web People Search", In Proceedings of the Fourth International Workshop on Semantic Evaluations, Jun. 2007, pp. 64-69.

J. Artiles et al., "WePS 2 Evaluation Campaign: Overview of the Web People Search Clustering Task", In World Wide Web Conference Series, Apr. 20-24, 2009, Madrid, Spain, 9 pages.

J. Huang et al, "Efficient Name Disambiguation for Large-scale Databases", In Proceedings of the 10th European Conference on Principles and Practice of Knowledge Discovery in Databases, Sep. 2006, pp. 536-544.

J. Tang et al., "A Unified Framework for Name Disambiguation", In World Wide Web Conference Series, Apr. 21-25, 2008, 2 pages.

K. Branting, "Name-matching Algorithms for Legal Case-management Systems", Journal of Information, Law and Technology, Mar. 22, 2002, 18 pages.

M. Bilenko et al., "Adaptive Name Matching in Information Integration", IEEE Intelligent Systems, Jan./Feb. 2003, 8 pages.

Masada, et al., "Citation Data Clustering for Author Name Disambiguation", In Proceedings of 2nd International Conference on Scalable Information Systems, Jun. 6-8, 2007, 8 pages.

P. Drineas et al., "Clustering in Large Graphs and Matrices", In Proceedings of the 2000 ACM-SIAM Symposium on Discrete Algorithms, Jan. 2000, pp. 291-299.

P. Treeratpituk et al., "Disambiguating Authors in Academic Publications using Random Forests", In ACM/IEEE Joint Conference on Digital Libraries, Jun. 15-19, 2009, Austin, Texas, 10 pages.

Thorsten Joachims, "Making Large-scale SVM Learning Practical", In Advances in Kernel Methods—Support Vector Learning, Dortmund, Jun. 15, 1999, 17 pages.

Treeratpituk, et al., "Disambiguating Authors in Academic Publications using Random Forests", In Proceedings of 9th ACM/IEEE-CS Joint Conference on Digital Libraries, Jun. 15-19, 2009, pp. 39-48.

Y. Song et al., "Efficient Topic-based Unsupervised Name Disambiguation", In ACM/IEEE Joint Conference on Digital Libraries, Jun. 18-23, 2007, 10 pages.

Y.F. Tan et al., "Search Engine Driven Author Disambiguation", In ACM/IEEE Joint Conference on Digital Libraries, Jun. 11-15, 2006, 2 pages.

Yang, et al., "Author Name Disambiguation for Citations Using Topic and Web Correlation", In Proceedings of 12th European Conference on Research and Advanced Technology for Digital Libraries, Sep. 2008, pp. 185-196.

Yin, et al., "Object Distinction: Distinguishing Objects with Identical Names", In Proceedings of 23rd International Conference on Data Engineering of IEEE, Apr. 15-20, 2007, pp. 1242-1246.

\* cited by examiner

AUTHOR DISAMBIGUATION

BACKGROUND OF THE INVENTION

As the number of electronically available documents continues to increase (e.g., via storage in digital libraries, academic databases, research databases, online sources, etc.), the number of ambiguous authors (e.g., different authors with the same or similar name) becomes more prevalent. Accordingly, when a user is attempting to find documents published by a particular author via submitting an author-based search query, the user is often provided with unsatisfactory search results that include a plurality of documents from multiple different authors with the same or similar name. Thus, a search engine that performs author-based searches is commonly confused and inaccurate when attempting to locate a set of documents corresponding to the particular author.

For example, a student may be working on a school project, and therefore, may want to access and review all documents written by "Tom Jones", a well-know professor at State University, whom the student is familiar with because he works in the same research area as the student's project. However, with the expanding global academic and professional human population, and the increasing availability of electronic documents available to search engines, there may be multiple different "Tom Jones" that have authored documents in the aforementioned research field or in other research fields. Thus, search engines (e.g., academic search engines) that provide author-based search functionality are presented with an author disambiguation problem that makes it difficult to provide accurate author-based search results that locate, match, and provide electronic documents for a particular author, while not providing electronic documents for other authors with the same or similar name that are not the intended focus of the user search.

SUMMARY OF THE INVENTION

The techniques described herein automatically generate high precision clusters and high recall clusters for a set of documents having an author with a same or similar name. The high precision clusters and the high recall clusters can then be used in a labeling process so that efficient and accurate author disambiguation is realized.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, and/or arrangement(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
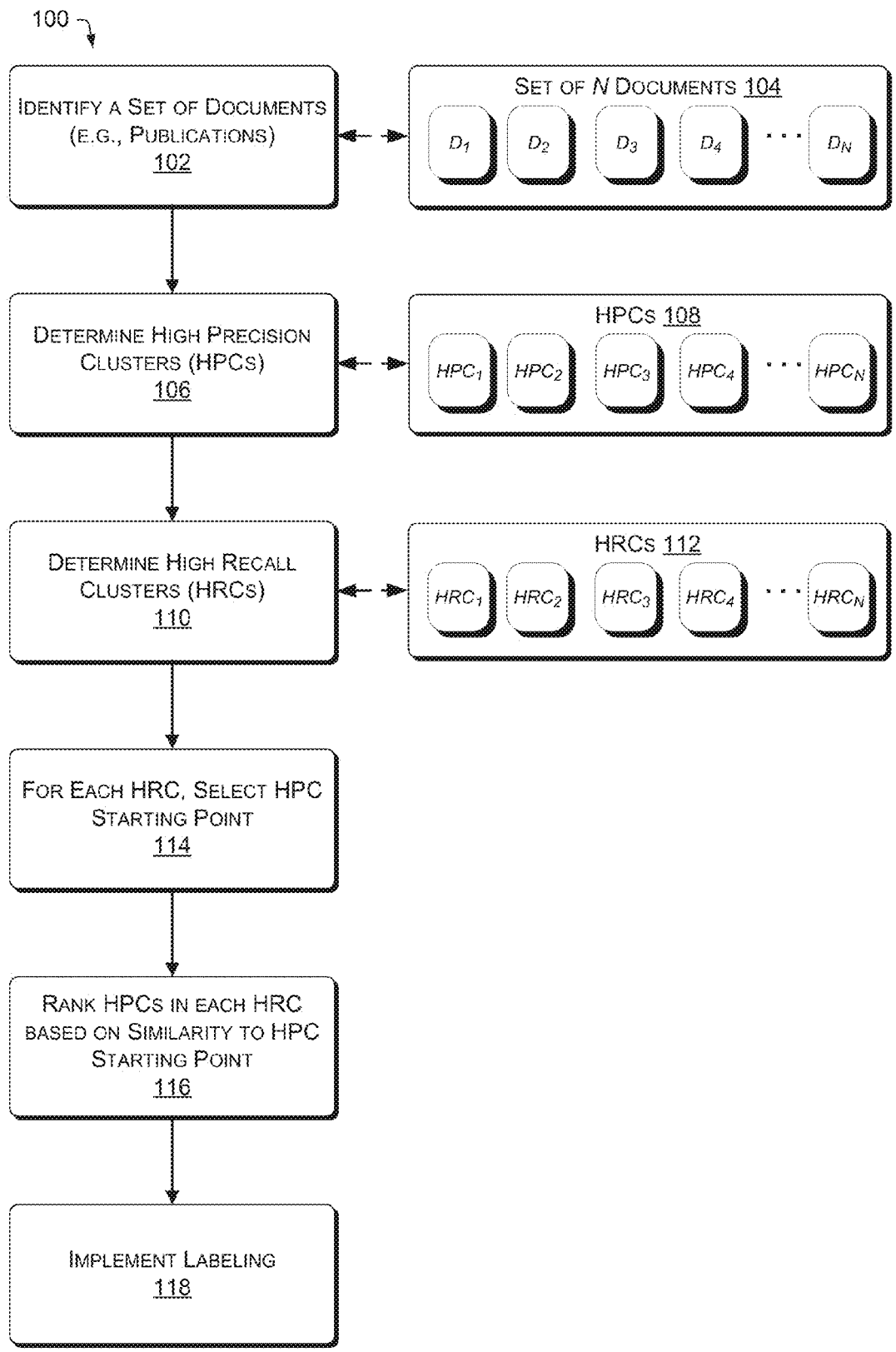
FIG. 1 illustrates an example overview that generates document clusters, in accordance with various embodiments described herein.

The following description sets forth techniques that solve the author disambiguation problem by automatically separating a plurality of documents into one or more clusters based on at least one author name. The clusters can then be labeled so that a set of documents corresponding to (e.g., authored by) a first author is accurately verified, while other sets of documents corresponding to other authors, with the same or similar name as the first author, can also be separated and manually verified. The labeling may be performed by one or more human judges. Accordingly, the techniques described herein may combine machine learning elements and human judging elements to efficiently and accurately determine which documents are associated with respective authors that are part of a group of authors each having a same or similar name. Moreover, the author disambiguation techniques discussed may be implemented prior to an author-based user search such that accurate results may be provided immediately, responsive to an author-based search where the search engine locates multiple different authors with the same or similar name, or in periodic intervals (e.g., every week, month, year, etc.).

Accordingly, users (e.g., students, scientists, researchers, politicians, professionals, etc.) in an academic environment, research environment, political environment, professional environment, and/or social environment can quickly and efficiently be provided with electronic documents that are accurately matched to a particular author that is the focus of an author-based user search query. In the context of this disclosure, "documents" may be, but are not limited to, publications, papers, books, patents, articles, or any electronic document drafted by one or more listed authors. Moreover, an author may be a human associated with the document (e.g., listed on the document), who in some way helped draft the document, contributed to the content of the document (e.g., research), worked on an experiment disclosed in the document, analyzed data in the document, and so forth.

Conventional fully automatic author disambiguation approaches that sort and separate a group of documents do not provide satisfactory results due to a lack of data or low data quality. For example, fully automatic author disambiguation approaches often incorrectly extract document content (e.g., via a Portable Document Format (PDF) parsing tool) and do not have the ability to consider variations of similar document content (e.g., abbreviations, acronyms, etc.). Moreover, fully automatic author disambiguation approaches suffer from a data sparsity problem because many documents lack helpful document metadata (e.g., document information that supplements an author name). Thus, fully automatic author disambiguation approaches are often confused, inaccurate, and unreliable when trying to separate a set of documents according to different authors with the same or similar name.

Accordingly, conventional author disambiguation approaches may leverage human judgment approaches to correct errors resulting from the fully automatic author disambiguation approaches by having human judges label each document or verify a labeling performed on the documents. This allows the documents to be accurately grouped and separated (e.g., disambiguated) according to their respective authors. However, this approach is expensive and not practical because of the large number of electronic documents, and the fact that the human judges examine and label each document, one by one. For example, if there are ten different "Tom Jones" authors in a group of tens of thousands documents stored in a digital library which are available to an academic search engine, the human labelers would have to search through each document, one by one, to determine and label which particular "Tom Jones" is an author of the document so that the academic search engine can provide accurate author-based search results.

The techniques discussed herein combine machine learning elements and human judging elements to improve author disambiguation and efficiently and accurately determine which documents are associated with respective authors that have a same or similar name. For example, the techniques first train classifiers for use in an algorithm that automatically groups documents into separate clusters. Then, human judges can efficiently label clusters of documents instead of searching through each document, one by one.

FIG. 1 illustrates an example overview of the techniques that provide author disambiguation for a plurality of documents. At 102, the techniques identify and receive a set of N documents 104 associated with an author name. Here, the set of N documents 104 is a portion of the plurality of documents (e.g., numerous documents stored in a digital library). While the author name may be identical across multiple documents of the set of N documents, the author name may also be similar variations of a name. For example, each of the N documents may have at least one author (e.g., a document may have multiple coauthors) named "Tom Jones" or "Thomas Jones" or "T. Jones" or "P. T. Jones". In various embodiments a search engine performing author-based search functionality may have local access to the plurality of documents stored in one or more local document databases (e.g., digital libraries, academic databases, research databases), the search engine may have network access to the plurality of documents stored in one or more online document databases, or a combination thereof.

At 106, the techniques determine high precision clusters (HPCs) 108 for the set of N documents 104 each having an author with the same or similar name. The goal of an HPC is to contain documents associated with a single author. However, all of the single author's documents may be distributed amongst multiple HPCs. Accordingly, the techniques attempt to place all of an author's documents in as few HPCs as possible. As further discussed herein, the HPCs change the manual labeling process from individual documents (e.g., one by one examination) to clusters of multiple documents, thereby making the human labeling process more efficient and less time-consuming.

At 110, the techniques group the HPCs 108 into high recall clusters (HRCs) 112 so that all documents that an author drafted or contributed to, at least in part, are present in one HRC (e.g., the same HRC). However, an HRC may contain HPCs corresponding to multiple different authors (e.g., two, three, five, ten, twenty, etc.) each having the same or similar name. A single HPC cannot be part of more than one HRC.

At 114, the techniques select an HPC as a starting point for each HRC. At 116, the techniques rank the HPCs within each HRC based on an HPC's respective similarity to the starting point HPC. This ranking helps the labeling process by sorting the multiple HPCs in a single HRC according to the different authors because documents authored (or coauthored) by the same person are more likely to have document features that are more similar than documents authored by two different persons. Accordingly, the one or more HPCs that are associated with the same author as the starting point HPC are more likely to be ranked higher (e.g., ranked closer to the starting point HPC) compared to an HPC associated with a different author.

At 118, the techniques implement a labeling process. For example, one or more human judges can provide manual labels to the ranked HPCs within each HRC to verify and confirm that the documents are associated with the correct authors. As previously discussed, the HPCs and the HRCs allow the human judges to efficiently label documents because the HPCs provide a larger granularity for labeling compared to examining each document one by one. The search engine is then able to consider the human labeling information and more accurately provide author-based search results.

Figure 2:
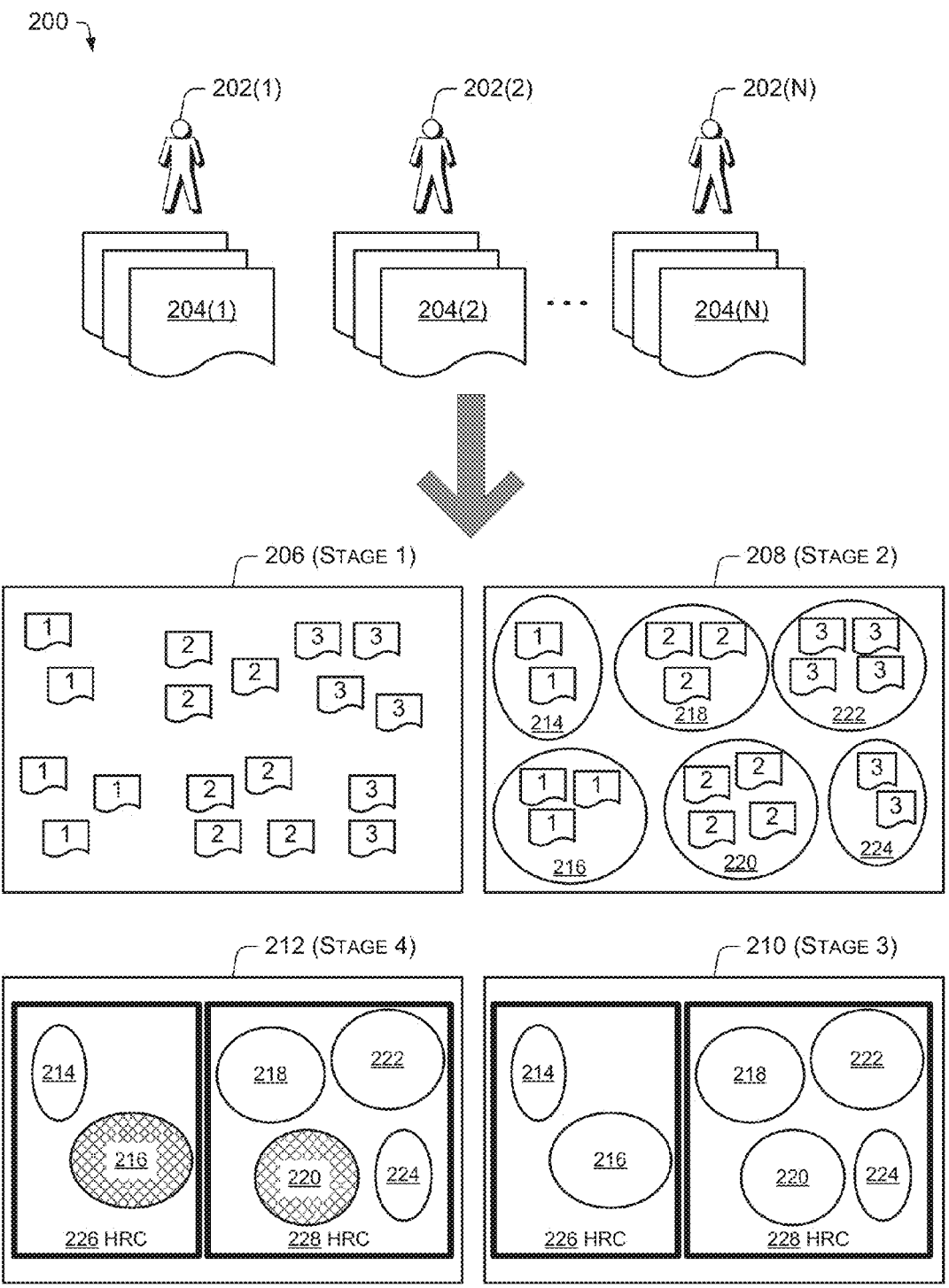
FIG. 2 illustrates an example environment that clusters the documents, in accordance with various embodiments described herein.

FIG. 2 illustrates an example environment 200 that obtains a set of N documents 104 associated with multiple different authors 202(1) . . . 202(N) with the same or similar name, and creates HPCs and HRCs prior to implementing the human labeling. As depicted, each of authors 202(1) . . . 202(N) are authors or co-authors of a respective set of documents 204(1) . . . 204(N). FIG. 2 depicts four stages (206, 208, 210, and 212) that cluster the documents 204(1) . . . 204(N). For instance, in stage one 206, the documents labeled with a one (1) are the documents 204(1) corresponding to author 202(1) (e.g., "Tom Jones" at State University). The documents labeled with a two (2) are the documents 204(2) corresponding to author 202(2) (e.g., "Thomas Jones" at State Research Institution). The documents labeled with a three (3) are the documents 204(N) corresponding to author 202(N) (e.g., "Tom Jones" at Global Health Organization). While FIG. 2 depicts three respective authors with a same or similar name, it is understood in the context of this disclosure, that there may be any number of authors with the same or similar names.

In the second stage 208, the techniques determine six HPCs 214, 216, 218, 220, 222, and 224. As previously discussed, an HPC contains a single author's documents. Accordingly, HPCs 214 and 216 may correspond to the documents of author 202(1) (e.g., "Tom Jones" at State University), HPCs 218 and 220 may correspond to the documents of author 202(2) (e.g., "Thomas Jones" at State Research Institution), and HPCs 222 and 224 may correspond to the documents of author 202(N) (e.g., "Tom Jones" at Global Health Organization). While the HPCs depicted in the second stage 208 contain two, three, and/or four documents, it is understood that HPCs are not limited in the number of documents contained. Moreover, while the number of HPCs corresponding to each author depicted in FIG. 2 is two, it is understood that this number may vary (e.g., two, four, eight, twenty, one hundred HPCs for each author). Thus, in a large scale application of the techniques to a digital library storing numerous documents, any number of HPCs corresponding to an author may each contain any number of documents.

In the third stage 210, the techniques group the HPCs from the second stage 208 into two HRCs 226 and 228. As previously discussed, the goal of an HRC is to contain all the documents, possibly separated into multiple HPCs, written by a particular author. Thus, HRC 226 contains each HPC corresponding to author 202(1), while HRC 228 contains each HPCs corresponding to authors 202(2) and 202(N).

In the fourth stage 212, the techniques determine an HPC starting point 216 and 220 for each HRC (e.g., as depicted by the fill-in shading). The HPC starting points 216 and 220 are representative clusters identified as good candidates to initiate the manual labeling process by one or more human judges. For example, since there is no overlap of author documents from one HRC 226 to another HRC 228, the HPC starting points 216 and 220 may be good candidate HPCs used to rank each of the HPCs in an HRC. This ranking is likely to sort the different HPCs within each HRC according to respective authors, which aids in the manual labeling process. For example, with respect to HRC 228, HPC 218 will most likely be ranked higher than HPC 222 and HPC 224 because HPC 218 is associated with the same author 202(2) as the starting point HPC 220.

The description provided herein is directed toward how the techniques determine the HPCs, the HRCs, and the starting point HPCs so that an efficient and improved human labeling process can be initiated, and accurate author disambiguation can be achieved.

Illustrative Architecture

Figure 3:
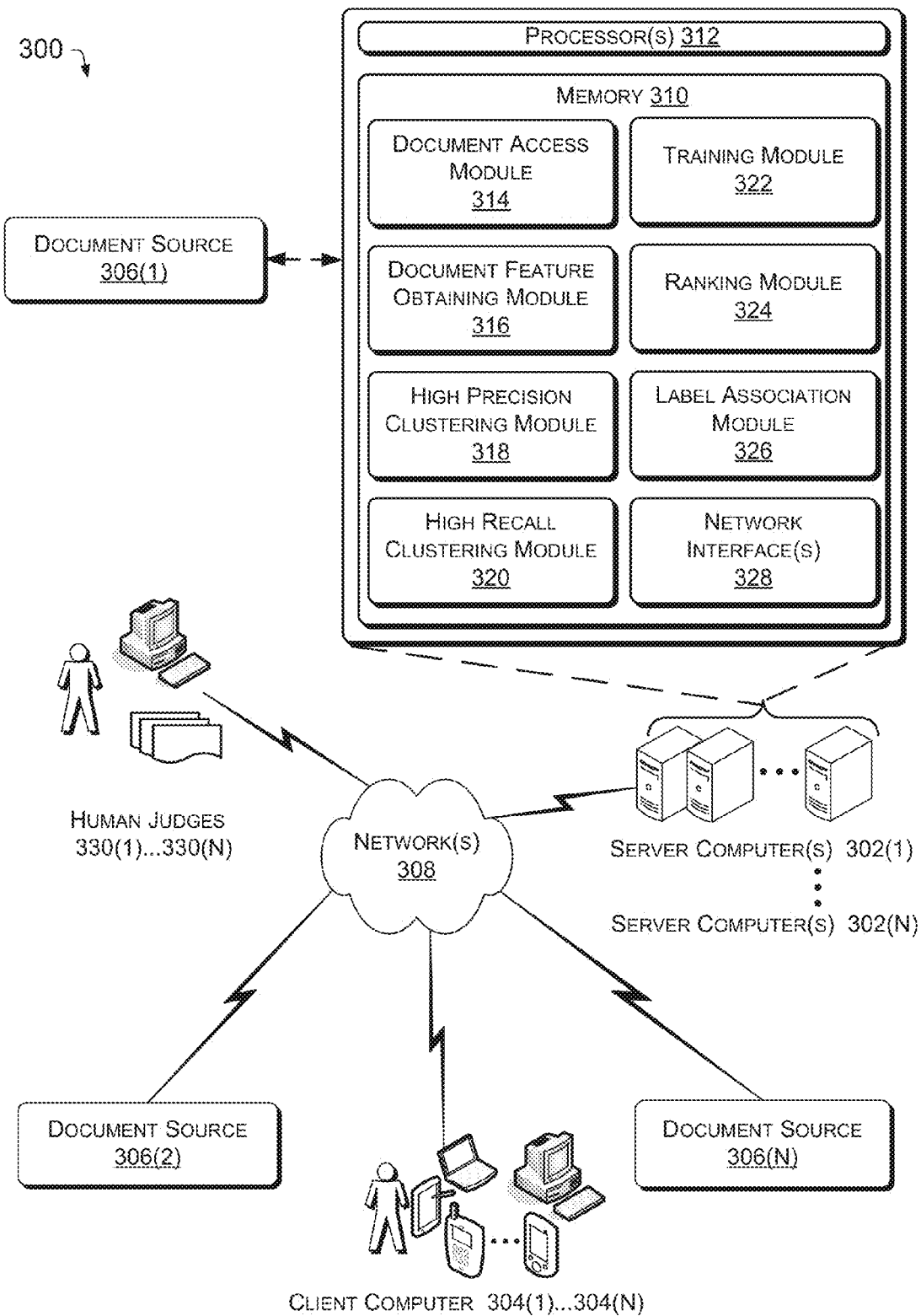
FIG. 3 illustrates an example architecture for implementing the described techniques, in accordance with various embodiments described herein.

FIG. 3 shows an illustrative architecture 300 that may employ the described techniques. To this end, architecture 300 includes one or more server computing devices 302(1) . . . 302(N), one or more client computing devices 304(1) . . . 304(N), and one or more document sources 306(1) . . . 306(N), each coupled to network(s) 308. In various embodiments, the server computing devices 302(1) . . . 302(N) may host document search functionality based in part on a name of an author. In various embodiments, a user submits an author-based search query via a web browser or other application at the one or more client computing devices 304(1) . . . 304(N). The client computing devices 304(1) . . . 304(N) may comprise one of an array of computing devices capable of connecting to the one or more network(s) 308, such as a server computer, a client computer, a personal computer, a laptop computer, a mobile phone, a personal digital assistant (PDA), tablets, gaming consoles, set top boxes, and the like.

In various embodiments, the architecture 300 can be the World Wide Web (WWW), including numerous PCs, servers, and other computing devices spread throughout the world. The server computing devices 302(1) . . . 302(N), the client computing devices 304(1) . . . 304(N), and the document sources 306(1) . . . 306(N) may be coupled to each other in various combinations through a wired and/or wireless network 308, including a LAN, WAN, or any other networking and/or communication technology known in the art. It is understood in the context of this document, that document sources 306(1) . . . 306(N) may include, but are not limited to, digital libraries, academic databases, research databases, online document sources, and so forth.

In other embodiments the architecture 300 may be associated with a particular environment (e.g., an academic institution, a university department library, a research company) that has access to one or more document sources 306(1) . . . 306(N) that are part of a local network. Thus, a user may submit an author-based search query via a web browser or other application at the one or more client computing devices 304(1) . . . 304(N) coupled to a local network.

Furthermore, the server computing devices 302(1) . . . 302(N) comprise a memory 310 and one or more processors 312. In various embodiments, the server computing devices 302(1) . . . 302(N) include a document access module 314, a document feature obtaining module 316, a high precision clustering module 318, a high recall clustering module 320, a training module 322, a ranking module 324, a label association module 326, and one or more network interface(s) 328, each of which are further discussed herein. Moreover, architecture 300 depicts one or more human judges 330(1) . . . 330(N) that manually label the HPCs, as previously discussed with respect to FIG. 1 and FIG. 2. For instance, the one or more human judges 330(1) . . . 330(N) may provide the manual labels to the documents via examining the individual HPCs via a client computer, or examining the physical hard copies of the documents in the HPCs. In various embodiments, the one or more human judges may be institution administrators, librarians, third-party document analyzers, students, authors, etc.

The processor(s) 312 may be a single processing unit or a number of units, all of which could include multiple computing units. The processor(s) 312 may be implemented as one or more microprocessors, microcomputers, microcontrollers, digital signal processors, central processing units, state machines, logic circuitries, and/or any devices that manipulate signals based on operational instructions. Among other capabilities, the processor(s) 312 may be configured to fetch and execute computer-readable instructions stored in the memory 310.

The memory 310 may comprise computer-readable media including, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device.

In contrast, communication media may embody computer readable instructions, data structures, program modules, or other data in a modulated data signal, such as a carrier wave, or other transmission mechanism. As defined herein, computer storage media does not include communication media.

The network interface(s) 328 enable network communication, and may include one or more ports for connecting the respective server computer to the network 308. The network interface(s) 328 can facilitate communications within a wide variety of networks and protocol types, including wired networks (e.g. LAN, cable, etc.) and wireless networks (e.g., WLAN, cellular, satellite, etc.). For instance, the network interface(s) may access, over network(s) 308, documents located at the document sources 306(1) . . . 306(N). In various embodiments, server computing device(s) 302(1) . . . 302(N) may have local access to one or more document sources 306(1) . . . 306(N).

It is understood in the context of this disclosure, that the functionality performed by the document access module 314, the document feature obtaining module 316, the high precision clustering module 318, the high recall clustering module 320, the training module 322, the ranking module 324, and the label association module 326 may be all inclusive on a single server computing device 302(1) implementing the author disambiguation techniques discussed herein in association with author-based searches, or the functionality performed by the modules may be spread amongst a plurality of server computing device(s) 302(1) . . . 302(N) connected to one another via network(s) 308. For instance, in one example functionality performed by the document access module 314 may be spread across multiple server computing devices. In another example, functionality performed by the document access module 314 may be entirely on a first server computing device, while functionality performed by the training module 322 may be performed on a different server computing device.

In various embodiments, the document access module 314 is configured to access a set of N documents 104, from a plurality of available documents, each document in the set having at least one author associated with a particular author name. The document feature obtaining module 316 is configured to obtain document features from the individual documents in the set of N documents 104. As further discussed herein, the document features are features associated with authors, or features that provide similarity indications for authors of two different documents. Accordingly, the high precision clustering module 318 and the high recall clustering module 320 use the obtained document features to determine HPCs and HRCs, respectively, based on similarities.

Figure 4:
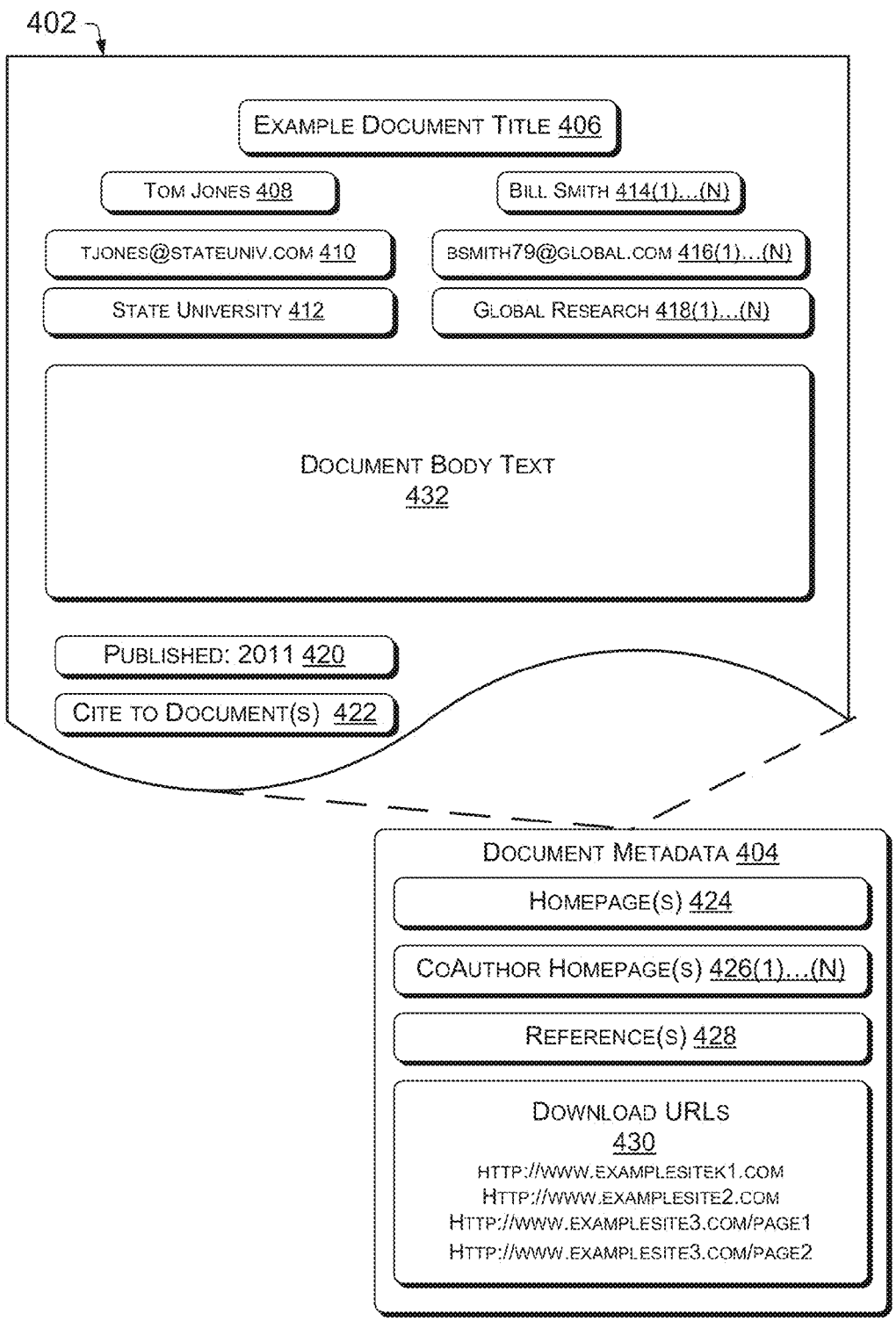
FIG. 4 illustrates an example document with features for implementing the described techniques, in accordance with various embodiments described herein.

For instance, with respect to the example document 402 in FIG. 4, the document feature obtaining module 316 may extract document features from the actual document 402, or document metadata 404 associated with the document (e.g., document information stored separately from the document or attached to the document). The examples features include, but are not limited to, a document title 406, a "focus" author name 408 (e.g., the author or coauthor with the same or similar name to other authors or coauthors of documents in the set of N documents 104), a focus author email 410 corresponding to the focus author name 408, a focus author affiliation 412 (e.g., company, academic institution, research institution, etc.), coauthor name(s) 414(1) . . . 414(N) when the document has more than one author, coauthor email(s) 416(1) . . . 416(N), coauthor affiliations 418(1) . . . 418(N), document publish year 420, citations to other documents 422, focus author homepage(s) 424, coauthor homepage(s), references 428, and download Uniform Resource Locators (URLs) 430. The document features mentioned above are descriptive of the content they represent. Moreover, the document features may be further discussed in more detail below. While FIG. 4 depicts selective document features as being part of either the actual document, or metadata 404 associated with the actual document 402, it is understood in the context of this disclosure that any one of the document features may be located in the actual document 402, the document metadata 404, or a combination of both. Furthermore, the aforementioned document features may also be located in the body text 432 of the document. As previously discussed, the document features are features associated with authors, or features that provide similarity indications of whether an author name for one document is the same or similar to an author name of another document.

For purpose of the discussion herein, the document access module 314 may have access to a plurality of available documents defined as $X=[x_1, x_2, x_3, \ldots, x_n]$, and each document $x_i$ has p authors $A=[a_1, a_2, a_3, \ldots, a_p]$ (e.g., p may be one, two, three, four, five, and so forth).

Using text string similarity between author names, the document access module 314 identifies and creates multiple different name blocks corresponding to each author and/or coauthor listed in all the available documents X. Each of the different name blocks may be defined as $Y=[y_1, y_2, y_3, \ldots, y_n]$. Thus, each $y_i$ corresponds to one or more of the human authors $A=[a_1, a_2, a_3, \ldots, a_p]$ listed for each document.

Moreover, the author disambiguation problem is realized when a name block, $y_i$, corresponds to a plurality of different authors. In this scenario, $y_i$ becomes the focus author name 408 for which the author disambiguation techniques are applied. For example, the techniques may be applied to the set of N documents 104 discussed above with respect to FIG. 1 which each have at least one author with the same or similar name block, $y_i$.

In various embodiments, two different author names (e.g., "Tom Jones" and "Thomas Jones") are found to be similar if they satisfy a threshold degree of textual similarity. For example, given two different name character strings, $string_1$ and $string_2$, the degree of textual similarity may vary in accordance with an edit distance between $string_1$ and $string_2$, the edit distance being the minimum number of edit operations required to transform $string_1$ into $string_2$. The edit operations may include the addition of a character or the deletion of a character.

In various embodiments, the high precision clustering module 318 is configured to cluster the accessed documents, $X=[x_1, x_2, x_3, \ldots, x_n]$, into l HPC clusters, $HPC=[hpc_1, hpc_2, hpc_3, \ldots, hpc_l]$. The l HPC clusters correspond to all the different author name blocks, $Y=[y_1, y_2, y_3, \ldots, y_n]$ such that the human judges can manually label the HPCs within each name block. In order to determine the HPCs, the high precision clustering module 318 maximizes the overall similarity, $V_{HPC}$, for the accessed documents X in accordance with the following high precision clustering algorithm, $$V_{HPC}=\Sigma_{p=1\ldots l}\Sigma_{x_i,x_j \in hpc_p} S_{HPC}(x_i,x_j),$$

$$s.t. \forall p, x_i \in hpc_p, x_j \in hpc_p,$$

$$y_i=y_j,$$

$$\forall i,j,p, q\max_{x_i \in hpc_p, x_j \in hpc_q, p \neq q}\{S_{HPC}(x_i, x_j)\} < \min_{x_i, x_j \in hpc_p}\{S_{HPC}(x_i,x_j)\}. \quad \text{Equ. (1)}$$

Here, $hpc_p$ and $hpc_q$ are different high precision clusters, and $S_{HPC}$ is the HPC similarity function that determines whether a "high precision" similarity between a pair of documents, $x_i$ and $x_j$, exists. When a high precision similarity exists (e.g., the HPC similarity function outputs a positive similarity score), then the high precision clustering module 318 determines that documents, $x_i$ and $x_j$, likely have a common author/coauthor and groups the documents into the same HPC. When a high precision similarity does not exist (e.g., the HPC similarity function outputs a negative similarity score), then the high precision clustering module 318 separates the documents into different HPCs. However, even though the high precision clustering module 318 separates the documents into different HPCs, there is still a possibility that the documents have a common author/coauthor (e.g., the same person). The goal of high precision clustering is to place all of one author's documents in as few HPCs as possible, while avoiding the placement of documents from different authors into the same HPC.

As further discussed herein, the training module 322 determines a high precision classifier for the HPC similarity function, $S_{HPC}$. The training module 322 trains the high precision classifier to determine whether two documents share at least one common author so that all the documents in a single HPC correspond to that particular real world person. The high precision classifier uses a selective group of "high confidence" document features to make such a determination so that there is a strong likelihood that an HPC includes documents corresponding to only one author, as further discussed in more detail below.

In various embodiments, the high recall clustering module 320 is configured to place all the documents of one author into a single HRC by grouping one or more HPCs associated with the author into the same HRC, as discussed above with respect to FIG. 2. Thus, the high recall clustering module 320 maximizes the overall similarity, $V_{HRC}$, for the accessed documents X in accordance with the following high recall clustering algorithm, $$V_{HRC}=\Sigma_{p=1\ldots l}\Sigma_{x_i,x_j\in hrc_p}S_{HRC}(x_i,x_j),$$

$$s.t. \forall p, x_i \in hrc_p, x_j \in hrc_q,$$

$$p \neq q,$$

$$y_i \neq y_j,$$

$$\forall i,j,p, q\max_{x_j\in hrc_p, x_j\in hrc_q, p=q}\{S(x_i, x_j)\} < \min_{x_i,x_j\in hrc_p}\{S_{HRC}(x_i,x_j)\}. \quad \text{Equ. (2)}$$

Here, $hrc_p$ and $hrc_q$ are different high recall clusters, and $S_{HRC}$ is the HRC similarity function that determines whether a "high recall" similarity between a pair of documents, $x_i$ and $x_j$, exists. In contrast to the HPC similarity function, the HRC similarity function uses "high recall" document features that loosen and relax the similarity determination compared to the high precision clustering so that an HRC contains a larger group of documents associated with one or more real world authors (e.g., that have the same or similar name). Moreover, the goal of high recall clustering is to place all of the documents corresponding to a particular real world author, which may be distributed across multiple different HPCs, into the same HRC. Thus, although there is not an explicit relation between HPCs and HRCs in equations (1) and (2), there are implicit relations between HPCs and HRCs associated with the different goals of high precision clustering and high recall clustering. For example, $S_{HPC}(x_i,x_j) \geq S_{HRC}(x_i,x_j)$, or in other words, if two documents are in the same HPC, then the two documents will be in the same HRC. Accordingly, although separate processes (e.g., high precision clustering and high recall clustering), the HPCs implicitly are grouped into HRCs in accordance with equations (1) and (2).

In various embodiments, the HRC similarity function, $S_{HRC}$, is configured to output a positive score indicating high recall similarity, or a negative score indicating no high recall similarity.

In various embodiments, the training module 322, in a training environment, separately determines the high precision classifier to be used in association with the HPC similarity function, $S_{HPC}$, and the high recall classifier to be used in association with the HRC similarity function, $S_{HRC}$, according to the following linear pair-wise classification model, $$f(\vec{x}) = <\vec{x},\vec{w}> - b. \quad \text{Equ. (3)}$$

Here, the feature vector, $\vec{x}$, is generated based on the respective document features obtained from a pair of documents by the document feature obtaining module 316, $\vec{w}$ is a trained document feature weighting vector, and b is a trained threshold parameter. In various embodiments, using different document feature signals, the training module 322 separately determines $\vec{w}$ and b for each of the high precision clustering and the high recall clustering using a supervised learning method, such as a support vector machine model.

Accordingly, the high precision clustering module 318 uses equation (3) with trained high precision model parameters in association with equation (1) when determining HPCs. Similarly, the high recall clustering module 320 uses equation (3) with separately trained high recall model parameters in association with equation (2) when determining HRCs.

In various embodiments, the high precision clustering module 318 and the high recall clustering module 320 employ various measures to determine a degree of similarity between document features obtained from a pair of documents, $x_i$ and $x_j$. One measure may be a degree of textual similarity between two corresponding document features (e.g., document title 406) using the textual edit distance determination as discussed above. Other measures may include shared item frequency (SIF) and inverse publication frequency (IPF) that generate document feature signal values from the obtained document features. The high precision clustering module 318 and the high recall clustering module 320 may use their respective document feature signal values to determine the HPC similarity and HRC similarity.

For example, suppose two documents each have a corresponding one or more items (e.g., list of coauthors, list of coauthor homepages, coauthor affiliation), $\text{Items}_1$ and $\text{Items}_2$. The high precision clustering module 318 and/or the high recall clustering module 320 defines SIF to represent a degree of similarity of the two lists as follows, $$SIF(\text{Items}_1, \text{Items}_2) = \frac{|\text{Items}_1 \cap \text{Items}_2|}{\sqrt{|\text{Items}_1||\text{Items}_2|}}. \quad \text{Equ. (4)}$$

Furthermore, the high precision clustering module 318 and/or the high recall clustering module 320 defines IPF to discount the importance of common features in the respective documents, as follows, $$IPF(\text{item}) = \frac{1}{\text{Frequency(item)}}. \quad \text{Equ. (5)}$$

Moreover, the high precision clustering module 318 and/or the high recall clustering module 320 compares the IPF of the two lists, $\text{Items}_1$ and $\text{Items}_2$, as the sum of shared IPF features, $$IPF(\text{Items}_1, \text{Items}_2) = \Sigma_{item \in \text{Items}_1 \cap item \in \text{Items}_2} IPF(item). \quad \text{Equ. (6)}$$

Thus, the high precision clustering module 318 and/or the high recall clustering module 320 uses a degree of textual similarity, SIF, and IPF to determine whether a pair of documents are similar in accordance with high precision clustering and/or high recall clustering.

In various embodiments, the high precision clustering module 318 uses a group of high confidence document feature signals to separate the plurality of documents X into different HPCs. Moreover, the training module 322 uses the same high confidence document feature signals to train the high precision model parameters $\vec{w}$ and b, via a support vector machine in a training environment, for example. The high confidence document feature signals used by the high precision clustering module 318 and the training module 322 are discussed herein in association with the obtained document features depicted in FIG. 4.

In various embodiments, the high precision clustering module 318 considers multiple high confidence document feature signals associated with the focus author name 408. The first focus author name signal, NameEqual, determines whether the text string for the focus author name 408 from a first document, $\text{name}_1$ for document $x_i$, is an exact match to the text string for the focus author name 408 of a second document, $\text{name}_2$ for document $x_j$. In various embodiments, this signal results in a Boolean value where one indicates an identical match and zero indicates no match. The second focus author name signal, NameSim, determines a degree of similarity between the two author name text strings, $name_1$ and $name_2$, when the text strings are not an identical match. The third focus author name signal determines the IPF for the respective focus author names, $IPF(name_1)$ and $IPF(name_2)$ in accordance with equation (5). When the $IPF(name_i)$ is small, the stronger the likelihood of a name ambiguity problem because if an author name occurs in only a few documents, the name is most likely not an ambiguous name.

In various embodiments, the high precision clustering module 318 employs the textual string comparison to consider, as a high confidence document feature signal, whether the focus author email 410 signals an exact match (e.g., the complete email address including the alias prefix "tjones" and email suffix "@stateuniv.com"). In various embodiments, this signal also returns a Boolean value of one when an identical match is true, or zero when false.

In various embodiments, the high precision clustering module 318 employs the textual string comparison to consider, as a high confidence document feature signal, whether the focus author affiliation 412 signals an exact match. This value may return a Boolean value of one when an identical match is true, or zero when false. The high precision clustering module 318 may also use the IPF in accordance with equations (5) and/or (6) to account for commonality degree for an affiliation.

In various embodiments, the high precision clustering module 318 employs the textual string comparison to consider, as a high confidence document feature signal, whether the focus author homepage 424 signals an exact match. This value may return a Boolean value of one when an identical match is true, or zero when false. The homepage 424 relates to an author profile web page, usually associated with an academic or professional organization, where users can browse and find information about an author. Often, the homepage 424 is listed in the actual document 402 or available via metadata associated with the document 424.

In various embodiments, the high precision clustering module 318 considers, as high confidence document feature signals, whether there are common coauthors 414(1) . . . 414(N) for two documents, $x_i$ and $x_j$. For instance, if document $x_i$ has a first list of coauthor names, $CA\_list_1$, and document $x_j$ has a second list of coauthor names $CA\_list_2$, the high precision clustering module 318 first employs the textual string comparison to determine a number of shared coauthor names between the two lists, $CA\_list_1$ and $CA\_list_2$. The resultant number is categorized as one, two, or three or more (e.g., OneCoauthor, TwoCoauthors, MoreCoauthors). Then, the high precision clustering module 318 uses equation (4) and equations (5) and (6) in association with the two lists, $CA\_list_1$ and $CA\_list_2$, to determine document similarity. These coauthor name signals indicate that while one common coauthor may be a good indication that the focus author 408 of the two documents is the same person, two, or even three common coauthors is more persuasive.

In various embodiments, the high precision clustering module 318 considers, as high confidence document feature signals, whether there are common coauthor emails 416(1) . . . 416(N) for two documents, $x_i$ and $x_j$. For instance, if document $x_i$ has a first list of coauthor emails, $CAE\_list_1$, and document $x_j$ has a second list of coauthor emails $CAE\_list_2$, the high precision clustering module 318 first employs the textual string comparison to determine a number of shared coauthor emails between the two lists, $CAE\_list_1$ and $CAE\_list_2$. The resultant number is categorized as one, two, or three or more (e.g., OneCoauthorEmail, TwoCoauthorEmails, MoreCoauthorEmails). Then, the high precision clustering module 318 uses equation (4) in association with the two lists, $CAE\_list_1$ and $CAE\_list_2$, to determine document similarity. Similar to the coauthor name signals, the coauthor email signals indicate that while one matching coauthor email may be a good indication that the focus author 408 of the two documents is the same person, two, or even three matching coauthor emails are more persuasive.

In various embodiments, the high precision clustering module 318 considers, as high confidence document feature signals, whether there are common coauthor affiliations 418(1) . . . 418(N) for two documents, $x_i$ and $x_j$. For instance, if document $x_i$ has a first list of coauthor affiliations, $CAA\_list_1$, and document $x_j$ has a second list of coauthor affiliations $CAA\_list_2$, the high precision clustering module 318 first determines a number of shared coauthor affiliations between the two lists, $CAA\_list_1$ and $CAA\_list_2$. The resultant number is categorized as one, two, or three or more (e.g., OneCoauthorAffiliation, TwoCoauthorAffiliations, MoreCoauthorAffiliations). Then, the high precision clustering module 318 uses equation (4) and equations (5) and (6) in association with the two lists, $CAA\_list_1$ and $CAA\_list_2$, to determine document similarity. Similar to the coauthor name signals, the coauthor affiliation signals indicate that while one matching coauthor affiliation may be a good indication that the focus author 408 of the two documents is the same person, two, or even three matching coauthor affiliation signals are more persuasive.

In various embodiments, the high precision clustering module 318 considers, as high confidence document feature signals, whether there are common coauthor homepages 426(1) . . . 426(N) for two documents, $x_i$ and $x_j$. For instance, if document $x_i$ has a first list of coauthor homepages, $CAH\_list_1$, and document $x_j$ has a second list of coauthor homepages $CAH\_list_2$, the high precision clustering module 318 first determines a number of shared coauthor homepages between the two lists, $CAH\_list_1$ and $CAH\_list_2$. The resultant number is categorized as one, two, or three or more (e.g., OneCoauthorHP, TwoCoauthorHPs, MoreCoauthorHPs). Then, the high precision clustering module 318 uses equation (4) in association with the two lists, $CAH\_list_1$ and $CAH\_list_2$, to determine document similarity. Similar to the coauthor name signals, the coauthor homepage signals indicate that while one matching coauthor homepage may be a good indication that the focus author 408 of the two documents is the same person, two, or even three matching coauthor homepages are more persuasive.

In various embodiments, the high precision clustering module 318 employs the textual string comparison to consider, as a high confidence document feature signal, the similarity of the document title 406 for two documents, $x_i$ and $x_j$. The document title often reflects the topic of the document, and therefore, indicates a degree of similarity. For instance, the high precision clustering module 318 splits each respective title 406 of two documents, $x_i$ and $x_j$, into separate lists of bigrams (e.g., two words, two characters, two syllables), $TitleBigrams_1$ and $TitleBigrams_2$, eliminating any stop words (e.g., "the", "able", "that", etc.). Then, the high precision clustering module 318 uses equation (4) and equations (5) and (6) in association with the two lists, $TitleBigrams_1$ and $TitleBigrams_2$, to determine document similarity.

In various embodiments, the high precision clustering module 318 employs the textual string comparison to consider, as a high confidence document feature signal, the similarity of the document reference(s) 428 for two documents, $x_i$ and $x_j$. For instance, the high precision clustering module 318 splits each respective document reference 428, $x_i$ and $x_j$, into separate lists of bigrams, $ReferenceBigrams_1$ and Reference- Bigrams$_2$, eliminating any stop words. Then, the high precision clustering module 318 uses equation (4) and equations (5) and (6) in association with the two lists, ReferenceBigrams$_1$ and ReferenceBigrams$_2$, to determine document similarity.

In various embodiments, the high precision clustering module 318 considers, as a high confidence document feature signal, whether document citations 422 relate two documents, x$_i$ and x$_j$, because an author, when working in a particular area, is likely to cite his/her other documents (e.g., previous documents). The document citations 422 signal is a binary signal that returns true when a first document, x$_i$, cites the second document, x$_j$, and vice versa.

In various embodiments, the high precision clustering module 318 employs the textual string comparison to consider, as high confidence document feature signals, matching download URLs 430 for two documents, x$_i$ and x$_j$. Download URLs indicate network locations where a user can download a particular document. Two documents are more likely to be drafted by the same author if the two documents are both available for download from the same URL. Accordingly, the high precision clustering module 318 may access download URLs 430 as document metadata information via public data sources such as the Association for Computer Machinery (ACM) and the Institute of Electrical and Electronics Engineers (IEEE). The high precision clustering module 318 may separate the download URLs into two separate lists of bigrams, DownloadURLs$_1$ and DownloadURLs$_2$. Then, the high precision clustering module 318 uses equation (4) and equations (5) and (6) in association with the two lists, DownloadURLs$_1$ and DownloadURLs$_2$, to determine document similarity.

In various embodiments, the high precision clustering module 318 considers, as a high confidence document feature signal, a publish year 420 for two documents, x$_i$ and x$_j$. The high precision clustering module 318 determines an interval difference in years, publishyear$_1$–publishyear$_2$. When the interval difference is big, the two documents are more likely to be associated with different authors.

Since the HRC similarity function loosens and relaxes the similarity determination compared to the HPC similarity function so that an HRC contains a larger group of documents compared to an HPC, the high recall clustering module 320 uses recall document feature signals to determine HRCs. Moreover, the training module 322 uses the same recall document feature signals to train the high recall model parameters $\vec{w}$ and b, via a support vector machine in the training environment, for example. The recall document feature signals are processed similar to the high confidence document feature signals used to determine HPCs, except for the differences discussed herein.

First, in various embodiments, the high recall clustering module 320 does not use document feature signals associated with IPF. This helps ensure high recall clustering.

Second, in various embodiments, the high recall clustering module 320 splits the focus author email 410 and the coauthor emails 416(1) ... 416(N) into a prefix alias (e.g., "tjones" and "bsmith79" in FIG. 4) and an email suffix (e.g., "stateuniv.com" and "global.com" in FIG. 4) before performing the similarity computations discussed above with respect to high precision clustering. The high recall clustering separates the similarity determination for email addresses (e.g., into alias prefix and email suffix) because authors often maintain the same alias prefix while changing the email suffix in accordance with different email addresses (e.g., professional email address, academic email address, personal email address). In various embodiments, the high recall clustering module 320 removes common email suffixes (e.g., @yahoo.com, @gmail.com, etc.) from the comparison lists.

Third, in various embodiments, the high recall clustering module 320 segments and parses the focus author affiliation 412 and the coauthor affiliations 418(1) ... 418(N) into three categories for separate similarity comparisons, instead of identifying an exact match for affiliation as discussed above with respect to high precision clustering. The three categories include: university, department, and group name. The high recall clustering module 320 may define heuristic rules to segment, parse, and identify different variations of the affiliation categories. For instance, if one segment of an affiliation text string contains a word such as "University" or "Univ" or "College", then the segment will be associated with the university category. In a further example, common department category words may include, for example, "chemistry", "biology", and "computer science". The group name category may include text that is has a higher degree of uniqueness, and therefore, a group name is not likely to be as general as the university and department segments. Each separate category is good for recall clustering because it loosens and relaxes the exact match requirement used in high precision clustering, yet still provides an indication of whether a pair of documents are similar.

Fourth, in various embodiments, the high recall clustering module 320 splits the focus author homepage 424 and the coauthor homepages 426(1) ... 426(N) into a domain (e.g., "exampledomain" from the URL http://www.exampledomain.com/docpage1) and a homepage suffix (e.g., "docpage1") before performing the similarity computations because authors from the same organization often share the same domain for their homepage across multiple documents, but may have different homepage suffixes.

In various embodiments, the high precision clustering module 318 and the high recall clustering module 320 optimize the respective similarity threshold parameters, b, as previously discussed with respect to equation (3), in order to further improve the accuracy of the HPCs (e.g., increase the likelihood that all the documents in a single HPC are associated with the same author) and HRCs (e.g., increase the likelihood that all the HPCs corresponding to the same author are grouped into the same HRC).

For instance, with respect to high precision clustering, the high precision clustering module 318 may set a similarity precision, $p_{pair}$, (e.g., a high precision predetermined confidence level). During the agglomerative high precision clustering, the high precision clustering module 318 adds a similar document that satisfies the similarity precision, $p_{pair}$, to a particular HPC. Accordingly, the probability that all documents in an HPC belong to the same real world author can be estimated as follows, $$P_{cluster} = p_{pair}^{T-1} \qquad \text{Equ. (7)}$$

Here, T is the number of documents in the HPC. Thus, in order to increase the probability that all documents in an HPC belong to the same author, the high precision clustering module 318 can tune or increase the similarity precision, $p_{pair}$. For example, if T=10 and $p_{pair}$=95.00%, the cluster precision, $P_{cluster}$, will be 63.02%. However, if the high precision clustering module 318 increases the similarity precision to, $p_{pair}$=99.90%, then the cluster precision, $P_{cluster}$, will be 99.10% for an HPC cluster size of T=10. Accordingly, the threshold parameter, b, is adjusted in accordance with similarity precision, $p_{pair}$, to improve the similarity precision of an HPC.

Moreover, the high recall clustering module 320 also adjusts the respective threshold parameter, b, for the high recall classifier in accordance with a similarity recall, $p_{pair}$ (e.g., a high recall predetermined confidence level), to improve the recall clustering accuracy for an HRC. However, the threshold parameter, b, is set in accordance with high recall confidence level (e.g., more relaxed compared to high precision clustering).

Once the HPCs are all grouped into separate HRCs, the ranking module 324 is configured to select a starting point HPC, HPC*, for each HRC, as follows, $$HPC^* = \operatorname{argmax}_{hpc_p} \Sigma_{x_i, x_j \in hpc_p, i \neq j} S(x_i, x_j). \qquad \text{Equ. (8)}$$

The starting point HPC most likely includes documents that will have a greater overall inner similarity compared to other HPCs in the HRC. Moreover, the starting point HPCs often include more documents (e.g., in number), and therefore, the starting point HPCs likely correspond to more important authors by virtue of the fact that there are more documents, indicating the author may be popular, published, and well-known in the field.

Once the ranking module 324 has selected a starting point HPC, HPC*, for each HRC, the ranking module 324 ranks the rest of the HPCs in each HRC based on a similarity with the starting point HPC, as follows, $$S(hp_c, hpc_q) = \Sigma_{x_i \in hpc_p, x_j \in hpc_q, p \neq q} S(x_i, x_j). \qquad \text{Equ. (9)}$$

Equation (9) outputs a similarity score that the ranking module 324 uses to rank the HPCs in each HRC.

Moreover, the ranked HPCs likely provide a list that includes consecutively ordered HPCs according to different authors. The human judges 330(1) ... 330(N) can receive the list and label the list of ranked HPCs to find where a first set of consecutively ordered HPCs associated with a first author transitions to a second set of consecutively ordered HPCs associated with a second author. This greatly reduces the human effort involved when solving the author disambiguation problem. For example, with respect to FIG. 2, the human labeling starts after stage four 212 is completed. With respect to HRC 228, the ranking module 324 will likely rank HPC 218 higher than HPC 222 and HPC 224 based on its overall similarity to starting point HPC 220 (e.g., because HPC 218 and 220 correspond to the same author 202(2)). This allows the human judges 330(1) ... 330(N) to search through and label HPCs (e.g., confirm, verify, and correct authors), instead of individual documents, and also notice when the ranked HPCs transition from a first author to a second author to a third author and so forth.

It is understood in the context of this disclosure, that with large scale digital libraries and academic search systems, the number of documents included in HPCs, and the number of HPCs included in each HRC, and the total number of HRCs, may be larger compared to the example number of documents, HPCs, and HRCs depicted in FIG. 2.

Once the human judges 330(1) ... 330(N) label the HPCs for author disambiguation purposes, the label association module 326 attaches the manual labeling information to the HPCs and the documents so that the information can be used by a search engine in association with an author-based search, thereby providing more accurate search results to a user searching for a group of documents authored by a particular person.

Illustrative Processes

Figure 5:
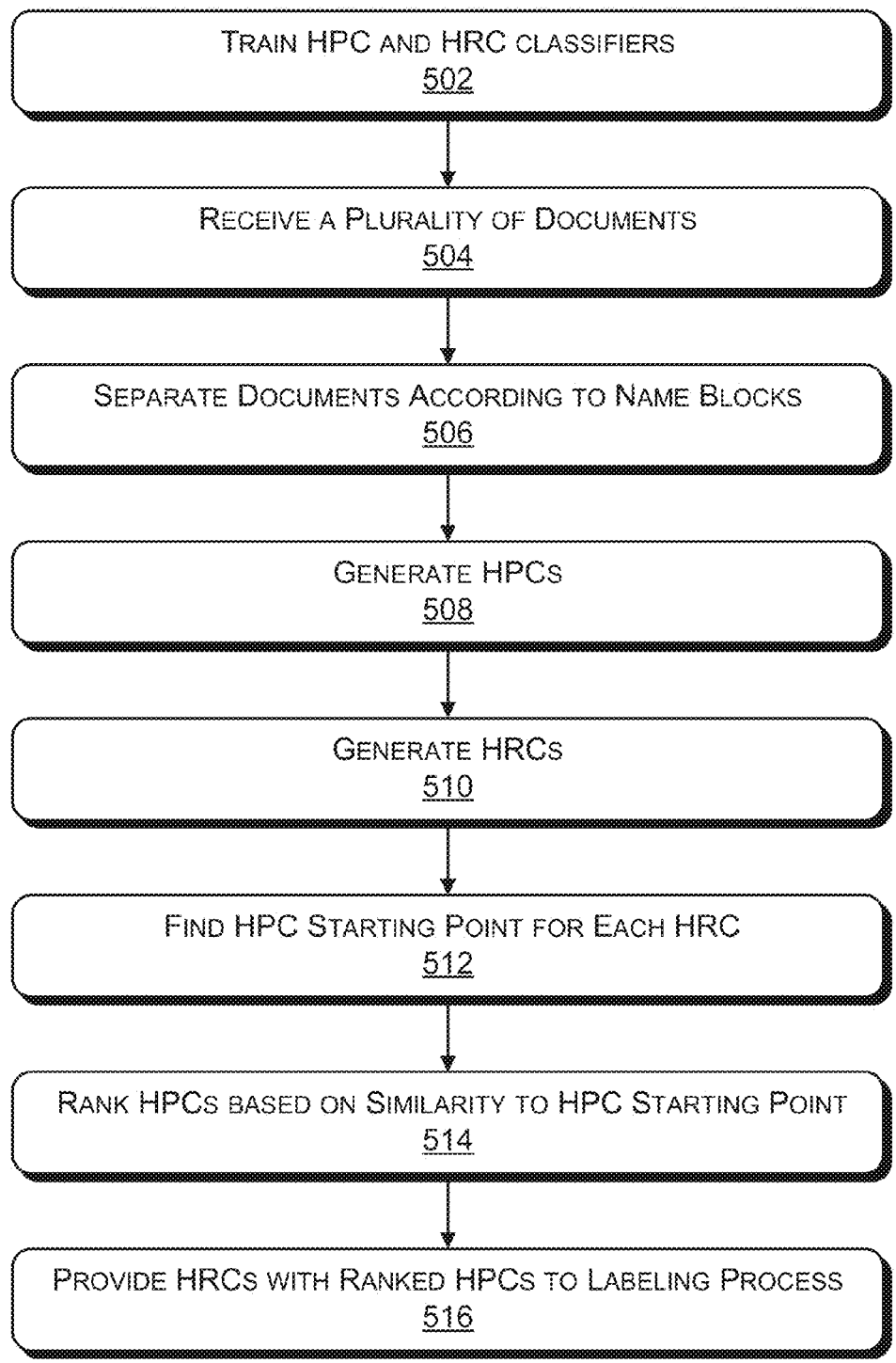
FIG. 5 illustrates an example process for implementing the described techniques, in accordance with various embodiments described herein.
Figure 6:
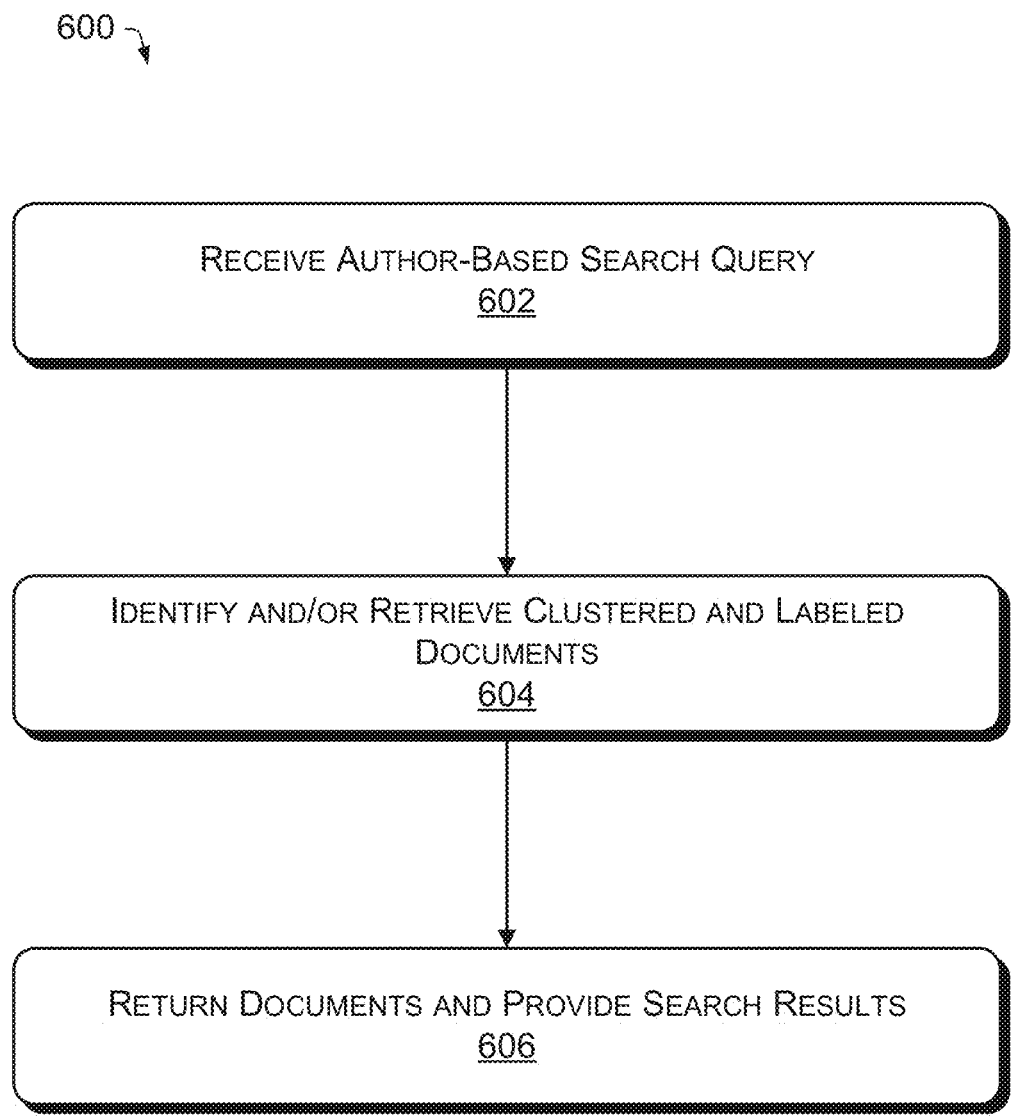
FIG. 6 illustrates an example author-based search process, in accordance with various embodiments described herein.

Example operations are described herein with reference to FIG. 5 and FIG. 6. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 that determines an HPC classifier and an HRC classifier to be used in association with the HPC similarity function and the HRC similarity function, respectively. At operation 502, the training module 322 uses document features processed by the document feature obtaining module 316 in a supervised training environment (e.g., support vector machine used on a set of "training" documents) to train the HPC classifier and HRC classifier (e.g., model parameters) as discussed above with respect to equation (3).

At operation 504, the document access module 314 receives a plurality of documents, $X=[x_1, x_2, x_3, \ldots, x_n]$. In various embodiments, the plurality of documents may be stored in a large scale digital library, which may include thousands of documents. Moreover, each document, $x_i$, is authored by one or more authors $A=[a_1, a_2, a_3, \ldots, a_p]$.

At operation 506, the high precision clustering module 318 and/or the high recall clustering module 320 identify a plurality of name blocks corresponding to the different authors collectively listed across the plurality of documents X. In various embodiments, the high precision clustering module 318 and/or the high recall clustering module 320 identify the name blocks via author name text string similarity (e.g., an edit distance threshold is satisfied). Moreover, the high precision clustering module 318 and/or the high recall clustering module 320 separate the plurality of documents according to the name blocks, $Y=[y_1, y_2, y_3, \ldots, y_n]$, such that each name block, $y_i$, is associated with a set of N documents (104 in FIG. 1). Then, the clustering and author disambiguation can be performed on each respective name block. The author disambiguation is realized for each name block where there are two or more real world authors (e.g., different persons) with the same or similar name.

At operation 508, the high precision clustering module 318 generates a plurality of HPCs for each name block, in accordance with equations (1) and (3). As discussed above, the high precision clustering module 318 has a goal that each HPC contain documents associated with a single author, and all the documents corresponding to that author are grouped into as few HPCs as possible.

At operation 510, the high recall clustering module 320 groups the HPCs for each name block into HRCs, in accordance with equation (2) and (3). As discussed above, the high recall clustering module 320 has a goal that each HRC contains all the documents and HPCs associated with a particular author. However, it is all right for an HRC to contain documents and HPCs corresponding to multiple different authors with the same or similar name.

At operation 512, the ranking module 324 identifies the HPC starting point for each HRC. The ranking module 324 may identify the HPC starting point for each HRC as discussed above in accordance with equation (8).

At operation 514, the ranking module 324 determines similarity scores for each HPC in the respective HRCs, possibly in accordance with equation (9), and ranks the HPCs according to the similarity scores. The similarity scores may be based at least in part on comparing the HPCs to the HPC starting point determined in operation 512.

At operation 516, the ranked HPCs may be provided to a labeling process. For example, the one or more human judges 330(1) . . . 330(N) may commence a manual labeling process which provides author verification and/or correction of the automatic clustering performed in the process 500. As discussed above, the high precision clustering (e.g., the HPCs) changes the labeling granularity from individual documents to clusters, and the HRCs provide clusters where similarity ranking can be implemented, thereby making the labeling process more efficient, less expensive, etc. Moreover, the label association module 326 electronically attaches the labeling information (e.g., author verification and author correction) to the documents so that it is available to a search engine performing author-based search functionality.

FIG. 6 illustrates an example author-based search process 600 that implements the automatic document clustering and human labeling discussed above with respect to FIG. 5. At operation 602, an author-based search query is received by a search engine (e.g., the architecture in FIG. 3). For example, the author-based search query may include one or more query terms the user at client computer 304(1) submits in order to identify a particular real world author of documents (e.g., name terms). In various embodiments, when the author-based search query is ambiguous, the search engine may prompt the user to specify which author is the focus of the author-based search query. For example, the search engine may convey, via a client interface, that there is more than one author named "Tom Jones", and then present the user with selective options indicating: "Tom Jones at State University", "Thomas Jones at State Research Institution", or "Tom Jones at Global Health Organization". The search engine may initiate the user prompt after the author disambiguation techniques have already been implemented.

At operation 604, the search engine identifies and/or retrieves the documents associated with the author-based search query. In various embodiments, the documents have already been clustered and labeled in accordance with the example process in FIG. 5.

At operation 606, the search engine returns the documents identified and/or retrieved in operation 604, so that the user is provided with search results including one or more documents authored by the particular real world author that is the focus of the author-based search query.

CONCLUSION

Although the subject matter has been described in language specific to structural features and/or methodological acts, it is to be understood that the subject matter defined in the appended claims is not necessarily limited to the specific features or operations described above. Rather, the specific features and operations described above are described as examples for implementing the claims.

The invention claimed is:

1. A computer-implemented method comprising:
under control of one or more processors of a computing device:
accessing a plurality of documents, each document having one or more authors;
generating a plurality of first clusters of one or more documents based at least in part on an author name and similarities between one or more document features, wherein individual ones of the first clusters are associated with respective authors and each of the one or more documents in each first cluster is associated with the respective author of that first cluster within a first predetermined confidence level;
generating a second cluster based at least in part on the author name and including one or more of the plurality of first clusters;
determining a starting point first cluster of the one or more of the plurality of first clusters included in the second cluster, the starting point first cluster having a highest similarity between any two documents of any first cluster included in the second cluster;
determining a ranking of a particular first cluster of the one or more first clusters within the second cluster based at least in part on determining a similarity between the starting point first cluster and the particular first cluster; and
providing at least one author name associated with at least one document in the particular first cluster.

2. The method as recited in claim 1, further comprising providing the second cluster to one or more devices associated with human labelers to implement an author disambiguation labeling process.

3. The method as recited in claim 1, wherein each of the documents in the plurality of first clusters have an author with a same or similar name.

4. The method as recited in claim 1, wherein each first cluster associated with the same author is included in a single second cluster within a second predetermined confidence level.

5. The method as recited in claim 1, wherein the one or more document features are associated with an author name.

6. The method as recited in claim 1, wherein the one or more document features are indicative of an author name.

7. The method as recited in claim 1, wherein the plurality of first clusters are generated in accordance with one or more classifier model parameters learned in a training environment.

8. The method as recited in claim 1, wherein the second cluster is generated in accordance with one or more classifier model parameters learned in a training environment.

9. The method as recited in claim 1, wherein the one or more document features are individually selected from a group comprising:
a focus author name;
a focus author email;
a focus author affiliation;
a focus author homepage;
a coauthor name;
a coauthor email;
a coauthor affiliation;
a coauthor homepage;
a document title;
a document reference;
a document citation;
a download Uniform Resource Locator; and
publication year.

10. The method as recited in claim 1, wherein the generating the second cluster comprises comparing at least one of the one or more document features.

11. The method as recited in claim 1, further comprising providing a sorted list of the one or more first clusters within the second cluster, wherein the sorted list is ordered based at least in part on similarity determinations between each respective first cluster in the list compared to the starting point first cluster.

12. A system comprising:
one or more processors;
  a memory, coupled to the one or more processors, storing:
    a document access module, operable by the one or more processors, that accesses a set of documents, each document having an author with a same or similar name;
    a document feature obtaining module, operable by the one or more processors, that obtains document features from the set of documents;
    a first clustering module, operable by the one or more processors, that generates one or more first clusters based at least in part on a first group of document feature signals determined from the document features;
    a second clustering module, operable by the one or more processors, that generates one or more second clusters based at least in part on a second group of document feature signals determined from the document features, the second group of document feature signals being different from the first group of document feature signals and each second cluster including a subset of the one or more first clusters;
    a ranking module, operable by the one or more processors, that identifies, within each second cluster, a starting point first cluster having a highest similarity between any two documents of any first cluster within each second cluster, determines a ranking of the subset of the one or more first clusters within each second cluster based at least in part on a degree of similarity of a respective first cluster compared to the starting point first cluster of the corresponding second cluster, and provides at least one author name associated with at least one document in the subset of the one or more first clusters within at least one of the second clusters.

13. The system of claim 12, wherein the first clustering module employs a high precision similarity algorithm including first trained classifiers to create the one or more first clusters.

14. The system of claim 13, wherein the second clustering module employs a high recall similarity algorithm including second trained classifiers to create the one or more second clusters, wherein the second trained classifiers are more relaxed compared to the first trained classifiers.

15. The system of claim 12, further comprising a label association module, operable by the one or more processors, that receives human labeling information applied to the subset of the one or more first clusters and associates the human labeling information with the set of documents to improve author-based search functionality.

16. A system, comprising:
one or more processors; and
  one or more computer storage device(s) comprising computer-executable instructions that, upon execution, configure the one or more processors to:
    access a set of documents, each document having at least one author with a same or similar name;
    obtain document features from the set of documents;
    generate a plurality of first clusters for the set of documents based at least in part on a first similarity comparison of document features in a first group of document features, wherein the plurality of first clusters is generated in accordance with a first similarity function including at least one first trained classifier;
    generate a plurality of second clusters for the set of documents based at least in part on a second similarity comparison of document features in a second group of document features, each second cluster containing one or more first clusters, wherein the plurality of second clusters is generated in accordance with a second similarity function including at least one second trained classifier;
    within each second cluster, identify a starting point first cluster that has a highest similarity between any two documents;
    rank the one or more first clusters within each second cluster to generate an ordered list based at least in part on a similarity of a respective first cluster with the identified starting point first cluster; and
    provide at least one author name associated with at least one document in one of the one or more first clusters within at least one of the second clusters.

17. The system of claim 16, wherein the document features obtained from the set of documents are individually selected from a group comprising:
  a focus author name;
  a focus author email;
  a focus author affiliation;
  a focus author homepage;
  a coauthor name;
  a coauthor email;
  a coauthor affiliation;
  a coauthor homepage;
  a document title;
  a document reference;
  a document citation;
  a download Uniform Resource Locator; and
  publication year.

* * * * *